Jan. 26, 1960   L. SARTORE   2,922,186
METHOD OF STUFFING SAUSAGE CASINGS
Filed Aug. 22, 1956   2 Sheets-Sheet 2
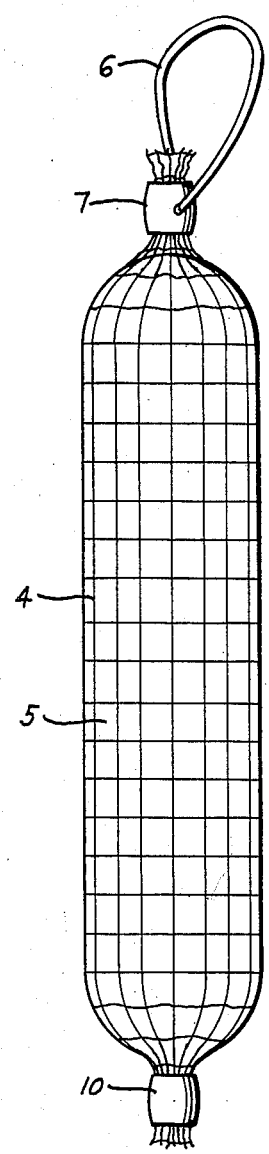
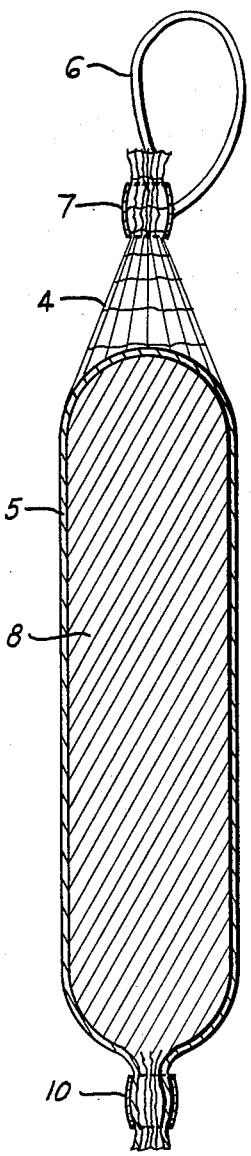
FIG. III   FIG. IV
INVENTOR
LAURENCE SARTORE
BY Lloyd F. Engle, Jr.
ATTORNEY

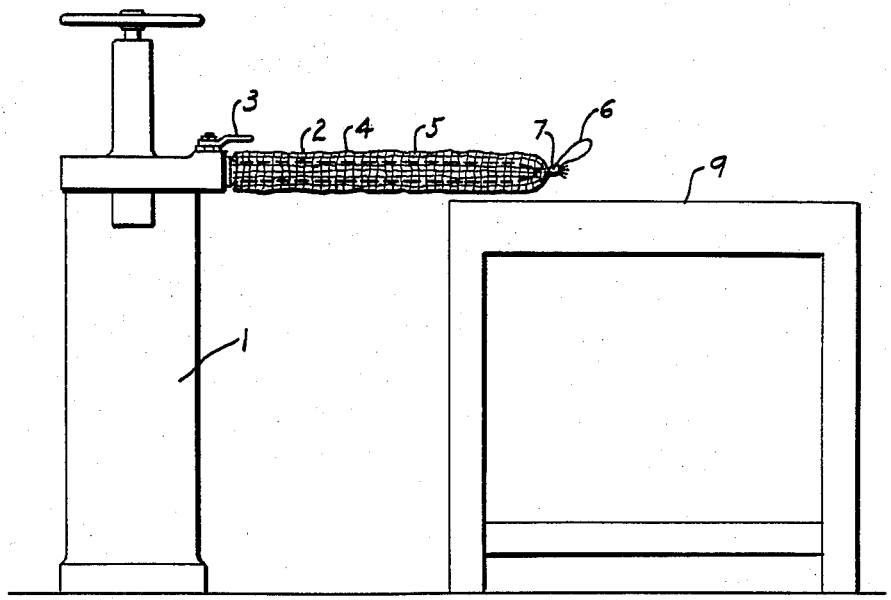
FIG. I
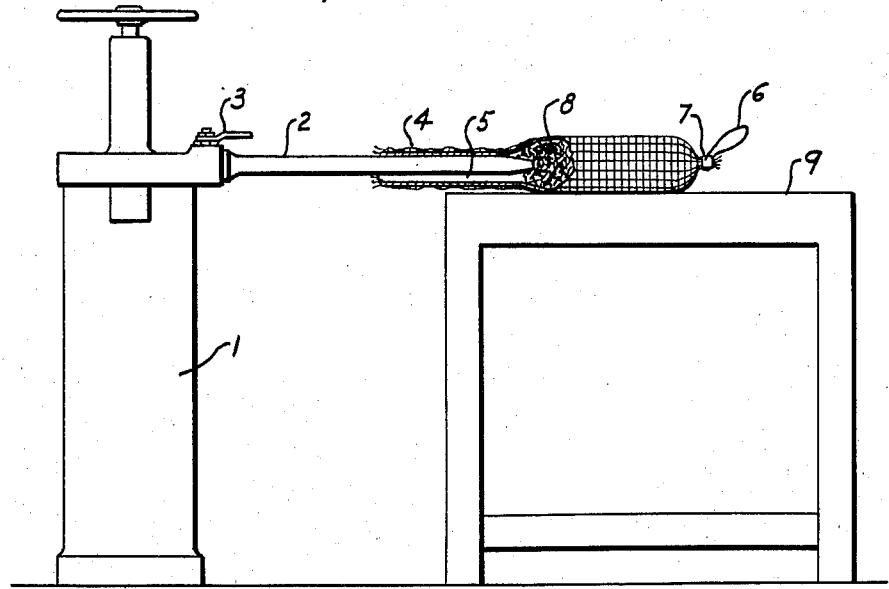
FIG. II

United States Patent Office 2,922,186
Patented Jan. 26, 1960

2,922,186

METHOD OF STUFFING SAUSAGE CASINGS

Laurence Sartore, Pittsburgh, Pa., assignor to Keystone Casing Supply Company, Carnegie, Pa., a partnership Application August 22, 1956, Serial No. 605,675

4 Claims. (Cl. 17—45)

This invention relates to a method of stuffing sausage casings and to the article of manufacture produced thereby.

For many years it was the practice in the art of manufacturing sausages of the Italian or Genoa type to twine the outside of the casing after the stuffing operation. The purpose of this twining, which was applied manually, was to compact the filling, thereby eliminating air spaces therein which caused spoilage, and also to provide a method of hanging the finished sausages.

This method was extremely tedious and time consuming and, since the twining was applied after stuffing, it provided no reinforcement for the casing during the stuffing operation.

Thereafter, certain improvements were made in the art including those embodied in Patent No. 1,505,218, issued to the applicant on August 19, 1924. These improvements consisted in providing a tube of reticulated fabric into which the casing was inserted before sutffing, thereby causing the casing to be supported to a degree against failure during the stuffing operation. However, in all of these improvements the tube of reticulated fabric, contemplated and disclosed, comprised diagonal strands of twining. The application of this type of netting afforded only a nominal amount of support for the casing since it is lateral support which is required to eliminate breakage of the casing, and the diagonally reticulated netting possesses the disadvantageous quality of expanding laterally under pressure while shortening longitudinally.

Also, in all of the prior art, it has been the practice to tie the open end of the casing and the end of the twining or netting together and hang the sausage therefrom. The result of this practice was that, as the sausage hung and dried, it pulled into a conical shape at the upper end, and the edible filling settled and shrunk into the lower portion of the casing causing the upper portion to become unusable waste. This undesirable effect was also partially caused by the characteristic of the diagonally reticulated twining or netting, that is, as the weight of the hanging sausage provided longitudinal force, the diagonally reticulated twining or netting elongated and provided lateral pressure, thereby contributing to the downward settlement of the filling and the creation of unusable waste at the top of the casing.

One object of my invention is to provide a method of stuffing sausages which applies a pre-formed reticulated tube of netting, composed exclusively of longitudinal and lateral strands, to the sausage casing prior to the stuffing operation, thereby to afford positive lateral support for the casing and eliminate breakage thereof.

A further object is to provide a method of stuffing sausages which will enable the sausage to hang free in a closed envelope of reticulated netting, to eliminate the settling and shrinking of the edible filling independently of and away from the upper portion of the casing.

Referring to the drawings:

Fig. I is an elevational view of a sausage stuffing machine with a casing and tubular netting in position for the actual stuffing operation.

Fig. II is an elevational view of a sausage stuffing machine and a partial elevational view of a sausage partly stuffed according to the method of my invention.

Fig. III is an elevational view of a sausage stuffed by the method of my invention and hung for drying and curing.

Fig. IV is a sectional view of a sausage stuffed by the method of my invention after it has dried and shrunk to its final state.

On the drawings, the numeral 1 indicates a sausage stuffing machine which has a filling tube 2 and a valve 3. Preparatory to the actual stuffing operation, a prefabricated reticulated tube 4, composed of threads of fiber or synthetic material arranged in exclusively longitudinal and lateral strands, is drawn over the casing 5, which is to be stuffed, and they are both then drawn over the filling tube 2 of the stuffing machine, being positioned so that the delivery end of the filling tube 2 is inserted proximate the closed end of the casing. Or, in the alternative, the casing 5 may first be drawn over the filling tube 2 and the reticulated tube 4 then drawn over the outside of the casing 5.

The closed end of the reticulated tube 4 has provided thereon an extension or hanging loop 6 which may either be an integral part of the woven reticulated tube 4, or may be attached thereto by the ferrule 7 before stuffing as shown in the accompanying drawings. In either event, there is no immovable engagement between the reticulated tube 4 and the casing 5 at the closed end.

When the valve 3 is opened, the filling 8, of sausage meat, is expelled from the open end of the filling tube 2 and is packed into the closed end of the casing 5 under the pressure exerted by the stuffing machine 1. This action expands the casing 5 to the extent permitted by the diameter of the reticulated tube 4 surrounding it and, in this respect, it is desirable that the reticulated tube 4 be of slightly less diameter than the casing 5, in order that the reticulated tube 4 may carry the full force of the stuffing operation without the casing 5 being unduly stressed.

As the stuffing operation is continued, the casing 5 together with the reticulated tube 4 is forced away from the stuffing machine 1 and slides along the table 9. When the casing 5 is almost completely filled, the stuffing operation ceases and the open end of the casing 5 is gathered together along with the open end of the reticulated tube 4 and they are closed by binding or by the application of an additional ferrule 10, as shown in the accompanying drawings.

Briefly to explain the advantages of my invention, the use of a reticulated tube of netting, comprising exclusively longitudinal and lateral strands, provides a positive support for the casing during the stuffing operation when it is needed and, during the subsequent hanging period, provides a support which does not exert additional pressure to cause deformation of the sausage. The application of the hanging loop at the preclosed end of the reticulated tube allows the casing and the filling to settle and shrink together, during the drying period, independently of the netting.

Obviously, the saving of labor and elimination of waste material is marked.

I claim as my invention:

1. The method of stuffing sausages which consists in surrounding a sausage casing closed at one end with a reticulated tabular net comprising longitudinal and lateral strands of fiber or other suitable material for providing a positive radially lateral support for the casing during stuffing, one pre-closed end, and suspending means attached to said pre-closed end, delivering the filling initially at the closed end and continuing to deliver the said filling toward the closed end of the casing until the casing is proximately filled throughout its length, and fastening the open ends of the said casing and net.

2. The method of stuffing sausages which consists in surrounding a sausage casing closed at one end with a reticulated tubular net comprising longitudinal and lateral strands of fiber or other suitable material for providing a positive radially lateral support for the casing during stuffing, one pre-closed end, and a hanging loop prewoven into said pre-closed end, delivering the filling initially at the closed end and continuing to deliver the said filling toward the closed end of the casing until the casing is proximately filled throughout its length, and binding together the open ends of the said casing and net.

3. The method of stuffing sausages which consists in surrounding a sausage casing closed at one end with a reticulated tubular net of lesser diameter than the casing, the said tubular net comprising longitudinal and lateral strands of fiber or other suitable material for providing a positive radially lateral support for the casing during stuffing, one pre-closed end, and suspending means attached to said pre-closed end, delivering the filling initially at the closed end and continuing to deliver the said filling toward the closed end of the casing until the casing is proximately filled throughout its length, and fastening the open ends of the said casing and net.

4. The method of stuffing sausages which consists in surrounding a sausage casing closed at one end with a reticulated tubular net of lesser diameter than the casing, the said tubular net comprising longitudinal and lateral strands of fiber or other suitable material for providing a positive radially lateral support for the casing during stuffing, one pre-closed end, and a hanging loop prewoven into said pre-closed end, delivering the filling initially at the closed end and continuing to deliver the said filling toward the closed end of the casing until the casing is proximately filled throughout its length, and binding together the open ends of the said casing and net.

References Cited in the file of this patent

UNITED STATES PATENTS

| | | |
|---|---|---|
| 1,505,218 | Sartore | Aug. 19, 1924 |
| 2,240,522 | Serr | May 6, 1941 |
| 2,255,810 | Replogle | Sept. 16, 1941 |
| 2,326,082 | Walter | Aug. 3, 1943 |

FOREIGN PATENTS

| | | |
|---|---|---|
| 206,421 | Switzerland | Nov. 1, 1939 |